United States Patent

[11] 3,630,619

[72] Inventors Fred D. Rosen
La Habra;
Walter W. Wrinkle, Seal Beach, both of Calif.
[21] Appl. No. 19,195
[22] Filed Mar. 13, 1970
[45] Patented Dec. 28, 1971
[73] Assignee North American Rockwell Corporation

[54] SPECTROPHOTOMETRY FOR REMOTE OBJECT IDENTIFICATION USING A LIGHT COMPENSATING FILTER
1 Claim, 3 Drawing Figs.

[52] U.S. Cl. .................................... 356/74,
250/226, 356/76
[51] Int. Cl. .................................... G01j 3/00,
G01j 3/40
[50] Field of Search .......................... 356/74, 76, 203; 250/226

[56] References Cited
UNITED STATES PATENTS
2,179,657  11/1939  Estey .......................... 356/76
3,115,545  12/1963  Gebel .......................... 356/203

Primary Examiner—Ronald L. Wibert
Assistant Examiner—V. P. McGraw
Attorneys—L. Lee Humphries, Charles F. Dischler and Dominick Nardelli ABSTRACT: An apparatus and means are disclosed for producing a compensating filter to be used in a spectrophotometer to compensate for variations in intensity of the various wavelengths in a particular light source and to compensate for the spectral response of the optical components in the spectrophotometer so that when the filter is used therein the filtered spectrum of the light source produces a photodetector output that is substantially constant with wavelength. A method utilizing the filter is disclosed to record the spectrophotometry of the light rays from an object.

INVENTORS.
FRED D. ROSEN
WALTER W. WRINKLE
ATTORNEY

SPECTROPHOTOMETRY FOR REMOTE OBJECT IDENTIFICATION USING A LIGHT COMPENSATING FILTER

This invention relates to the art of spectrophotometry and, more particularly to a means for compensating for variations between different illuminating and recording means and to a means for recording the light intensity with respect to wavelength in order to produce an output that is more readily identifiable with the object emanating the light rays.

Matter and objects are recognized by the human eye by the quantity and quality of visible light that emanates therefrom. The human eye is also capable of recognizing the different hues emanating from, for example, the different plants. However, at relatively great distances, the human eye loses its sensitivity and cannot differentiate between, for example, a field of clover and a field of alfalfa. In the past, attempts have been made to analyze the reflected light from the various fields of vegetation in a spectrophotometer. Each from the various fields of vegetation in a spectrophotometer. Each form of plant life has been observed to reflect or transmit its own subtle characteristic light wavelengths and intensities, including infrared and ultraviolet, provided that each form was illuminated by a hypothetical light source that has the characteristic for producing light wherein the intensity is constant with wavelength. However, practical light sources do not have this characteristic, and available photodetectors do not output a signal that corresponds to intensity for different wavelengths.

In this application the term spectrophotometry of a light source, will refer to its spectrum and the measured intensity of its various wavelengths, i.e., two light sources have the same spectrophotometry when plots of intensity versus wavelength of both sources are identical.

Therefore, an object of this invention is to provide a means for observing the spectrophotometry of reflected or transmitted light which means compensates for variations in spectrophotometry of the illuminating light.

Another object is to provide a means for compensating for the differences in sensitivity of the photodetectors and other optical components at the various wavelengths.

Another object is to provide a means that plots the curve representing intensity versus wavelengths of the filtered light rays.

Another object is to provide a process for making a compensating filter which compensates for variations in intensity at the various wavelengths of the illuminating light rays.

These and other objects and features of advantages will become apparent from the following detailed description of an illustrative embodiment of the invention reference being made to the accompanying drawings wherein.

Figure 1:
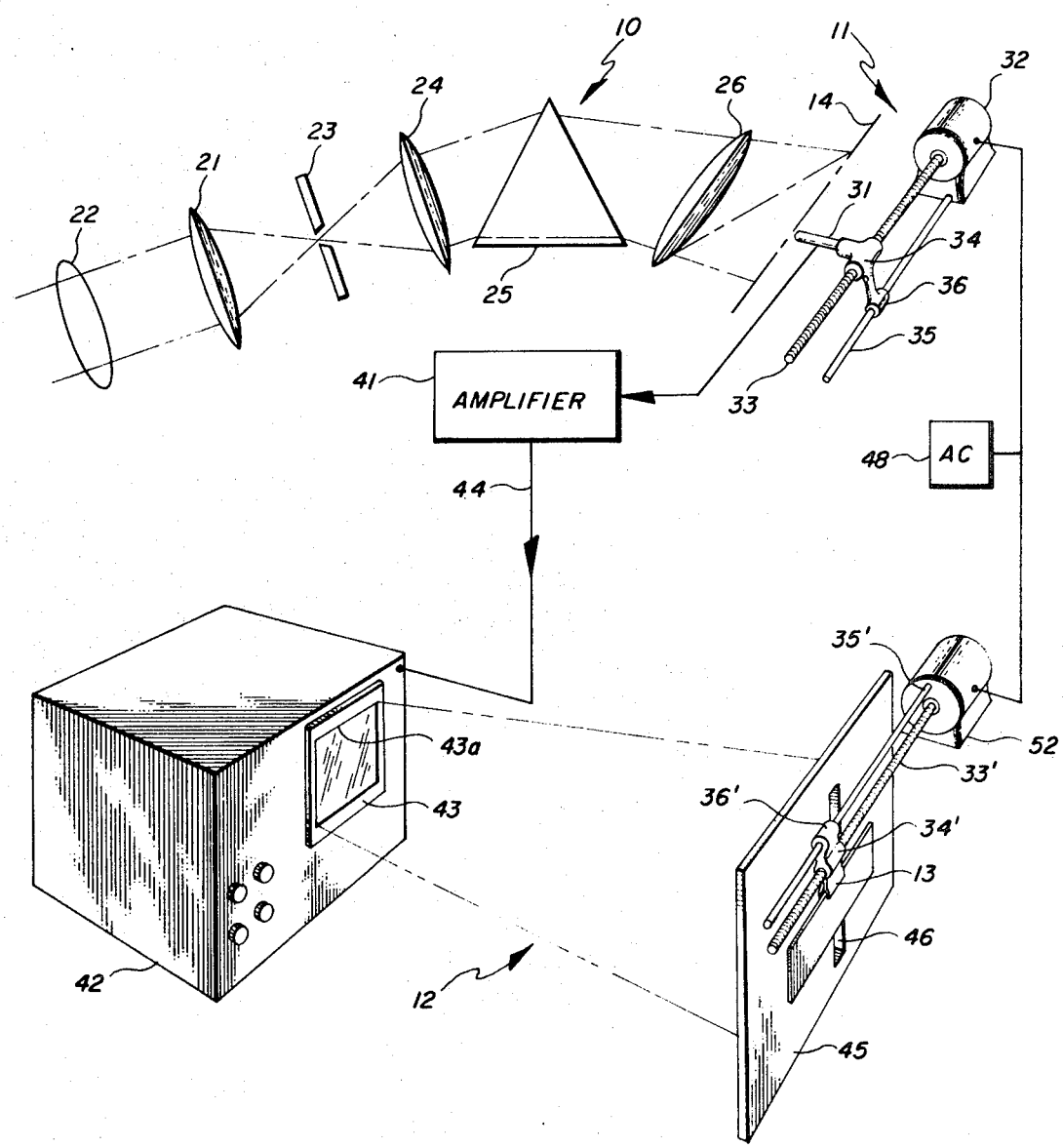
FIG. 1 shows schematically the apparatus for making the variable density light compensating filter.

Referring to the drawings and to FIG. 1, in particular, the schematic representation depicts a spectrophotometer with a means 10 for forming the spectrum, a means 11 for measuring the intensity of the various wavelengths, and a means 12 for exposing a film 13 whereby the opacity along its length is proportional to the intensity of the spectrum of light rays produced at a focal plane 14 of the spectrophotometer. The spectrophotometer includes an objective lens 21 that gathers a bundle of light rays 22 which may be sun rays reflected from magnesia (MgO), as is standard in the art, and which sun rays will illuminate the objects to be analyzed. The rays 22 are focused by the lens 21 onto a slitted mask 23 so that a narrow elongated light beam passes through the slit in the mask. The rays then pass through a collimating lens 24, a triangular prism 25, and a focusing lens 26 which focuses the various wavelengths of light a the focal plane 14. A person skilled in the art understands that a diffraction grating could be substituted for the prism 25 and may be more desirable in some applications, for example, where one is interested in the infrared or ultraviolet region or both.

In this invention a photodetector 31 is mounted such that its light entrance aperture transverses the focal plane 14 so that only a narrow bandwidth of light enters the detector 31. The detector 31 is moved smoothly by an electric motor 32 which rotates a helical screw 33. The detector 31 is mounted on a nut 34 that engages the screw 33. The nut 34 is prevented from turning with the screw in a standard manner by a fixed rod 35 and bushing 36 that is attached to the nut 34 to provide the required smooth uniform motion to the detector 31. The detector 31 inherently outputs a current that is proportional to the light intensity entering it for a particular wavelength The output current is fed to an amplifier 41 which amplifies and converts the current to a voltage signal. This signal is fed by a lead 44 to the vertical control of a cathode-oscilloscope 42 which has been set to produce a raster on its screen. One skilled in the art could produce a raster on the screen by adding standard components and performing known procedures to the circuit of the scope 42. The oscilloscope 42 is provided with a mask 43 that has a rectangular opening 43a. The oscilloscope is set by turning the various controls (not shown) in a standard manner so that when no voltage is applied to the lead 44 the raster is displaced downward and the portion of the scope's screen which is visible through the opening 43a is dark. Then when the voltage is raised on lead 44 the raster rises on the screen in proportion to the voltage rise. Therefore, the amount of emitted light from the screen 45 having a long, narrow, slot 46. On the opposite side of the screen 45, from the scope 42 is disposed the film 13 which is mounted on a nut 34' which engages a screw 33' in the same manner that the detector 31 is prevented from turning. Now, the film 13 can be transversely moved, smoothly and uniformly, by energizing a motor 52. Preferably, motors 32 and 52 are synchronous motors, which rotate at the same speed, since they are energized by the same AC power supply 48, and the screws 33 and 33' are identical whereby the photodiode tube 31 and the film 13 move transversely at the same speed. After the film 13 is exposed in this manner, it is developed so that the portion that was exposed the least is clear and the opaqueness of the other portions is proportional to the exposure, or, as it is commonly referred to in the film developing trade, the "gamma" equals one. Since a rectangular opening 43a is used in the mask 43, the relation between output voltage from the amplifier and opacity is linear. If other than a linear relationship is desired, the aperture in the mask 43 can be made other than rectangular, e.g., a triangle with point down could be shaped to yield a quadratic relationship.

Figure 2:
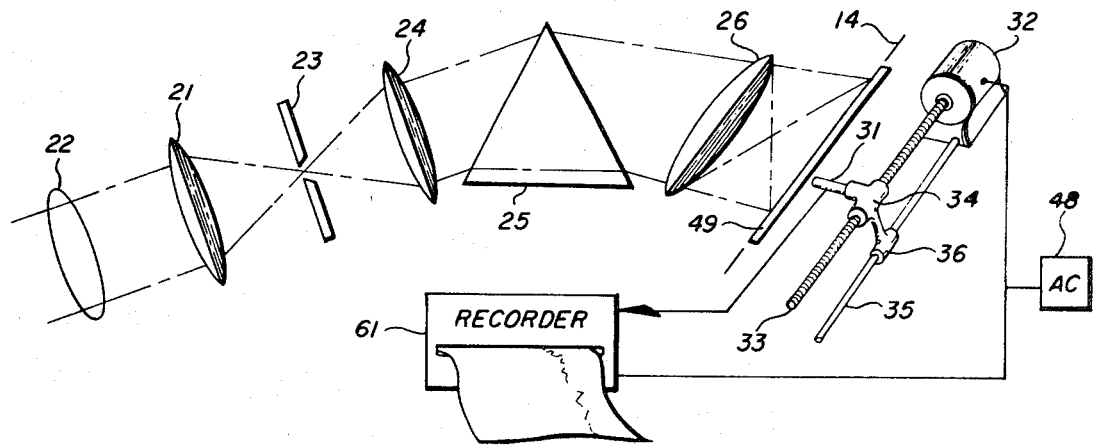
FIG. 2 shows schematically the apparatus wherein the filter is used and the intensity versus wavelength is plotted.

Referring to FIG. 2, a typical use of the developed film is shown in schematic. The developed film will hereinafter be referred to as a variable density-compensating filter 49. Shown schematically is the same spectrophotometer as shown in FIG. 1. Therefore the various representative wavelengths on the filter 49 can be positioned to match the corresponding wavelengths at the focal plane 14. Now the bundle of rays 22' are the rays reflected by the object to be analyzed, for example, an alfalfa field (not shown). A spectrum of the rays 22' is produced at the focal plane 14 as before. The photodetector 31 reads the light rays passing through the filter 49. The current signal is fed to a recorder 61 which records current versus wavelength. The current from the detector should be now proportional to the intensity of the light rays divided by the opacity of the filter at each wavelength as the detector 31 transverses across the spectrum. The recording is accomplished in a standard manner, for example, as motor 32 sweeps the detector 31 across the focal plane the recorder 61 moves the recording paper, accordingly.

Figure 3:
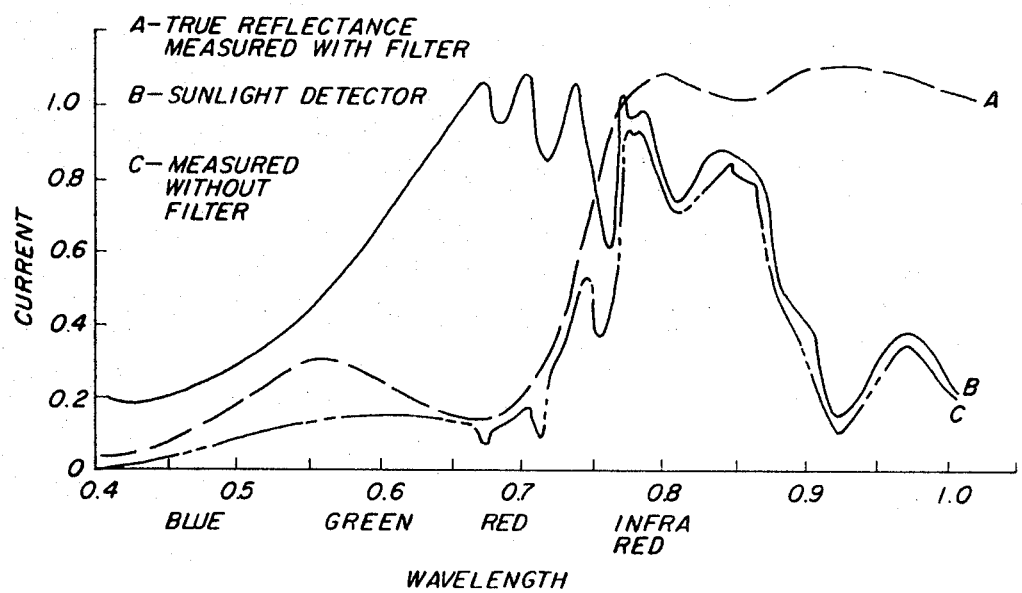
FIG. 3 shows a typical record of intensity versus wavelength of the light rays to be analyzed when viewed with the filter, without the filter, and illuminated by the hypothetical light source.

FIG. 3 shows various plots as may be produced by recorder 61. The dash line A is a curve of the true reflectance of some form of green vegetation . This curve would be obtained when the particular vegetation is illuminated by the above mentioned hypothetical light source and the source and the response of the optical components is constant with respect to wavelength. The solid line B is the curve of the illuminating light source, e.g., the sun. The curve incorporates the variations in the wavelengths f the source and the variations in response, between wavelengths, of the detector The curve B would be a plot of the current from the detector 31 when the apparatus is used as in FIG. 1 and the output of the detector 31 is coupled to the recorder 61 of FIG. 0. Long and short dash line C would be a curve of the reflected light of the particular vegetation when illuminated by the light source that produced curve B when no compensating filter 49 is used. Now, when the compensating filter 49 is used in the spectrophotometer of FIG. 2, which filter has been made as described above for the light source that produces curve B, a curve similar to curve A would be obtained and if the gain of the amplifier on the recorder 61 is adjusted accordingly, the particular curve can be made to overlap curve A.

With the present disclosure in view, modifications thereof would appear to those skilled in the art. Accordingly, the invention is not limited to the illustrated embodiment but includes all such modifications and variations within the scope of the invention as defined in the claims.

What is claimed is:

1. A method for identifying a remote object by spectrophotometering with a light source which is used to illuminate the object, said method comprising the steps of:

forming the spectrum of the rays of said light source, sensing the intensity of the various wavelengths of the rays, producing a signal that is related to the intensity, controlling the output light of another light source with said signal, producing a narrow light beam from the output light, moving said narrow beam relative to a film to expose the film in relation to the intensity of said beam, developing the film to a gamma of one forming the spectrum of the light rays reflected by said remote objects, filtering the spectrum of the reflected rays with said film, and analyzing the intensity of the filtered wavelengths.

* * * * *

UNITED STATES PATENT OFFICE
CERTIFICATE OF CORRECTION

Patent No. 3,630,619      Dated December 28, 1971

Inventor(s) SPECTROPHOTOMETRY FOR REMOTE OBJECT IDENTIFICATION USING A LIGHT COMPENSATING FILTER It is certified that error appears in the above-identified patent and that said Letters Patent are hereby corrected as shown below:

COLUMN 1:
    Line 18 - Change "from" to --form--.

COLUMN 2:
    Line 31 - After "screen 45" and before "having" insert the following:

--is proportional to voltage on lead 44. The emitted light rays fall on a screen 45--.

Line 32 - Change "slot" to --slit--.

Line 34 - After "screw 33" and before "in the same" insert the following:

--and is prevented from turning by a rod 35' and a bushing 36'--.

COLUMN 3:
    Line 5 - After "wavelengths" and before "the" change the "f" to --of--.

Line 9 - "FIG. O" should be changed to --FIG. 2--.

Signed and sealed this 17th day of April 1973.

(SEAL)
Attest:

EDWARD M. FLETCHER, JR.
Attesting Officer

ROBERT GOTTSCHALK
Commissioner of Patents